(12) United States Patent
Namihira

(10) Patent No.: US 7,164,687 B2
(45) Date of Patent: Jan. 16, 2007

(54) QUEUE CONTROL METHOD AND RELAY APPARATUS USING THE METHOD

(75) Inventor: Daisuke Namihira, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1110 days.

(21) Appl. No.: 10/106,963

(22) Filed: Mar. 26, 2002

(65) Prior Publication Data

US 2002/0141423 A1 Oct. 3, 2002

(30) Foreign Application Priority Data

Mar. 30, 2001 (JP) ............................. 2001-102440

(51) Int. Cl.
*H04L 12/28* (2006.01)
(52) U.S. Cl. ...................... 370/412; 370/229
(58) Field of Classification Search ................ 370/412, 370/413, 414–418, 411
See application file for complete search history.

(56) References Cited

U.S. PATENT DOCUMENTS

| | | | | |
|---|---|---|---|---|
| 6,052,375 | A * | 4/2000 | Bass et al. ................... | 370/412 |
| 6,721,324 | B1 * | 4/2004 | Shinohara ................ | 370/395.1 |
| 2002/0136230 | A1 * | 9/2002 | Dell et al. ................... | 370/416 |
| 2002/0181484 | A1 * | 12/2002 | Aimoto ....................... | 370/413 |
| 2003/0046414 | A1 * | 3/2003 | Pettyjohn et al. ........... | 709/230 |

FOREIGN PATENT DOCUMENTS

| | | |
|---|---|---|
| JP | 60057441 | 4/1985 |
| JP | 08130542 | 5/1996 |
| JP | 10135975 | 5/1998 |
| JP | 10276206 | 10/1998 |
| JP | 11-27275 | 1/1999 |
| JP | 11017702 | 1/1999 |
| JP | 11032055 | 2/1999 |
| JP | 11-122256 | 4/1999 |
| JP | 11346246 | 12/1999 |
| JP | 2000-244521 | 9/2000 |

OTHER PUBLICATIONS

Japanese Office Action dated Jan. 10, 2006, with translation.

* cited by examiner

*Primary Examiner*—Min Jung
(74) *Attorney, Agent, or Firm*—Katten Muchin Rosenman LLP

(57) ABSTRACT

A queue control method used in a relay apparatus which includes a plurality of ports for sending and receiving and performs relay of flows between networks is provided, in which the queue control method includes the steps of: performing queue control in which queue control parts which are connected to one or more ports enqueue flows from the one or more ports to a plurality of queues each having different priority, and dequeue the flows; switching flows dequeued from the queue control parts and sending the flows dequeued from the queue control parts from the ports; and sending and receiving control signals between the queue control parts such that queue control for arbitrary queue in the queue control parts is performed.

14 Claims, 11 Drawing Sheets

FIG.5

| QUEUE | THRESHOLD NUMBER | THRESHOLD |
|---|---|---|
| 1 | 1 | $T_{1-1}$ |
|   | 2 | $T_{1-2}$ |
|   | ⋮ | ⋮ |
|   | a | $T_{1-a}$ |
| 2 | ⋮ | ⋮ |
| ⋮ | ⋮ | ⋮ |
| n | ⋮ | ⋮ |

FIG.7

| QUEUE | THRESHOLD NUMBER | DEQUEUE CONTROL SIGNAL | | | | DEQUEUE CONTROL SIGNAL TIMER |
|---|---|---|---|---|---|---|
| | | 1 | 2 | ... | n | |
| 1 | 1 | DQ1-1-1 | DQ1-1-2 | ... | DQ1-1-n | TQ1-1 |
| | 2 | DQ1-2-1 | DQ1-2-2 | ... | DQ1-2-n | TQ1-2 |
| | ... | ... | ... | ⋰ | ... | ... |
| | a | DQ1-a-1 | DQ1-a-2 | ... | DQ1-a-n | TQ1-a |
| | ... | ... | ... | ⋰ | ... | ... |
| 2 | ... | ... | ... | ⋰ | ... | ... |
| ... | ... | ... | ... | ⋰ | ... | ... |
| n | ... | ... | ... | ⋰ | ... | ... |

| QUEUE | THRESHOLD NUMBER | DEQUEUE DISCARD CONTROL SIGNAL | | | | DEQUEUE DISCARD SIGNAL TIMER |
|---|---|---|---|---|---|---|
| | | 1 | 2 | ... | n | |
| 1 | 1 | DQ1-1-1 | DQ1-1-2 | ... | DQ1-1-n | TQ1-1 |
| | 2 | DQ1-2-1 | DQ1-2-2 | ... | DQ1-2-n | TQ1-2 |
| | ... | ... | ... | ⋰ | ... | ... |
| | a | DQ1-a-1 | DQ1-a-2 | ... | DQ1-a-n | TQ1-a |
| | ... | ... | ... | ⋰ | ... | ... |
| 2 | ... | ... | ... | ⋰ | ... | ... |
| ... | ... | ... | ... | ⋰ | ... | ... |
| n | ... | ... | ... | ⋰ | ... | ... |

FIG.8

| QUEUE | BANDWIDTH ERROR NUMBER | BANDWIDTH ERROR THRESHOLD |
|---|---|---|
| 1 | 1 | $B_{1-1}$ |
|   | 2 | $B_{1-2}$ |
|   | ⋮ | ⋮ |
|   | b | $B_{1-b}$ |
| 2 | ⋮ | ⋮ |
| ⋮ | ⋮ | ⋮ |
| n | ⋮ | ⋮ |

FIG.10

| QUEUE | BANDWIDTH ERROR NUMBER | BANDWIDTH CONTROL SIGNAL | | | | BANDWIDTH CONTROL SIGNAL TIMER |
|---|---|---|---|---|---|---|
| | | 1 | 2 | ... | n | |
| 1 | 1 | $BC_{1\text{-}1\text{-}1}$ | $BC_{1\text{-}1\text{-}2}$ | ... | $BC_{1\text{-}1\text{-}n}$ | $TC_{1\text{-}1}$ |
| | 2 | $BC_{1\text{-}2\text{-}1}$ | $BC_{1\text{-}2\text{-}2}$ | ... | $BC_{1\text{-}2\text{-}n}$ | $TC_{1\text{-}2}$ |
| | ... | ... | ... | ... | ... | ... |
| | b | $BC_{1\text{-}b\text{-}1}$ | $BC_{1\text{-}b\text{-}2}$ | ... | $BC_{1\text{-}b\text{-}n}$ | $TC_{1\text{-}b}$ |
| 2 | ... | ... | ... | ... | ... | ... |
| ... | ... | ... | ... | ... | ... | ... |
| n | ... | ... | ... | ... | ... | ... |

QUEUE CONTROL METHOD AND RELAY APPARATUS USING THE METHOD

BACKGROUND OF THE INVENTION

1. Field of the Invention

The present invention relates to a queue control method and a relay apparatus using the method. More particularly, the present invention relates to a queue control method for a relay apparatus including a plurality of transmit/receive ports which are connected to a LAN (Local Area Network) or a WAN (Wide Area Network) and a relay apparatus using the method.

2. Description of the Related Art

Priority control is performed for relayed flows in some relay apparatuses having transmit/receive ports connected to a LAN or a WAN. Thus, large-scale relay apparatuses having a large number of transmit/receive ports, and relay apparatuses which perform accurate priority control are required. In this specification, "port" is a transmit/receive end, or a transmit/receive end which is connected to a logical circuit established on a physical circuit. "flow" indicates a stream of a specific communication such as a communication between terminals/networks, and a communication between terminals in a specific application.

When implementing priority control by using conventional queue control in the relay apparatus, as shown in FIG. 1, when the relay apparatus is small, a queue control part 12 is provided for a plurality of ports 10a–10x in which the queue control part 12 performs priority control for every flow entered into the relay apparatus from the ports 10a–10x. Flows output from the queue control part 12 are switched by the switch 14 to each destination so as to be output from each corresponding port 10a–10x.

When the relay apparatus is large or when the relay apparatus accommodates very high-speed circuits, only one queue control part can not support the speed or the size. Thus, as shown in FIG. 2, a configuration can be adopted in which one queue control part is provided to each port in the relay apparatus (or provided to some ports).

However, when there are a plurality of queue control parts 12a–12x exist in a relay apparatus, the priority control is performed only within each of the queue control parts 12a–12x. However, priority control is not performed in the relay apparatus as a whole. For example, when a low priority flow to a specific destination is queued in the queue control part 12a for example and a high priority flow to the same specific destination is queued in the queue control part 12b in which any other flow does not exist, data of the low priority flow is sequentially dequeued from the queue control part 12a so that the data is sent to the switch 14 and data of the high priority flow is sequentially dequeued from the queue control part 12b so that the data is sent to the switch 14.

Thus, the switch 14 performs switching for the two flows at the same ratio. As a result, the low priority flow and the high priority flow are processed in the same priority. Thus, there is problem in that priority control in the relay apparatus as a whole is not realized.

In addition, in a bandwidth control, when a plurality flows in which each dequeue bandwidth is established are concentrated to one destination so that the speed of the flows becomes equal to or greater than a physical circuit speed, dequeue bandwidths are decreased at the same rate for each flow irrespective of the priority of each flow. As a result, there is a problem in that the priorities of the relay apparatus are ignored.

SUMMARY OF THE INVENTION

An object of the present invention is to provide a queue control method and an relay apparatus using the method in which priority control and bandwidth control can be performed in the relay apparatus as a whole even though the relay apparatus includes a plurality of queue control parts.

The above object can be achieved by a queue control method used in a relay apparatus which includes a plurality of ports for sending and receiving and performs relay of flows between networks, the queue control method includes the steps of: performing queue control in which queue control parts which are connected to one or more ports enqueue flows from the one or more ports to a plurality of queues each having different priority, and dequeue the flows; switching flows dequeued from the queue control parts and sending the flows dequeued from the queue control parts from the ports; and sending and receiving control signals between the queue control parts such that queue control for arbitrary queue in the queue control parts is performed.

Thus, adjustment between a plurality of queue control parts can be performed, and priority control and bandwidth control can be performed in the apparatus as a whole.

BRIEF DESCRIPTION OF THE DRAWINGS

Other objects, features and advantages of the present invention will become more apparent from the following detailed description when read in conjunction with the accompanying drawings, in which:

FIG. 5 shows an example of contents of the threshold table 32A;

FIG. 7 shows an example of contents of a dequeue control signal table 33A;

FIG. 8 shows an example of a bandwidth error table 43A;

FIG. 10 shows an example of a bandwidth control signal table 44A;

DETAILED DESCRIPTION OF THE PREFERRED EMBODIMENTS

Figure 1:
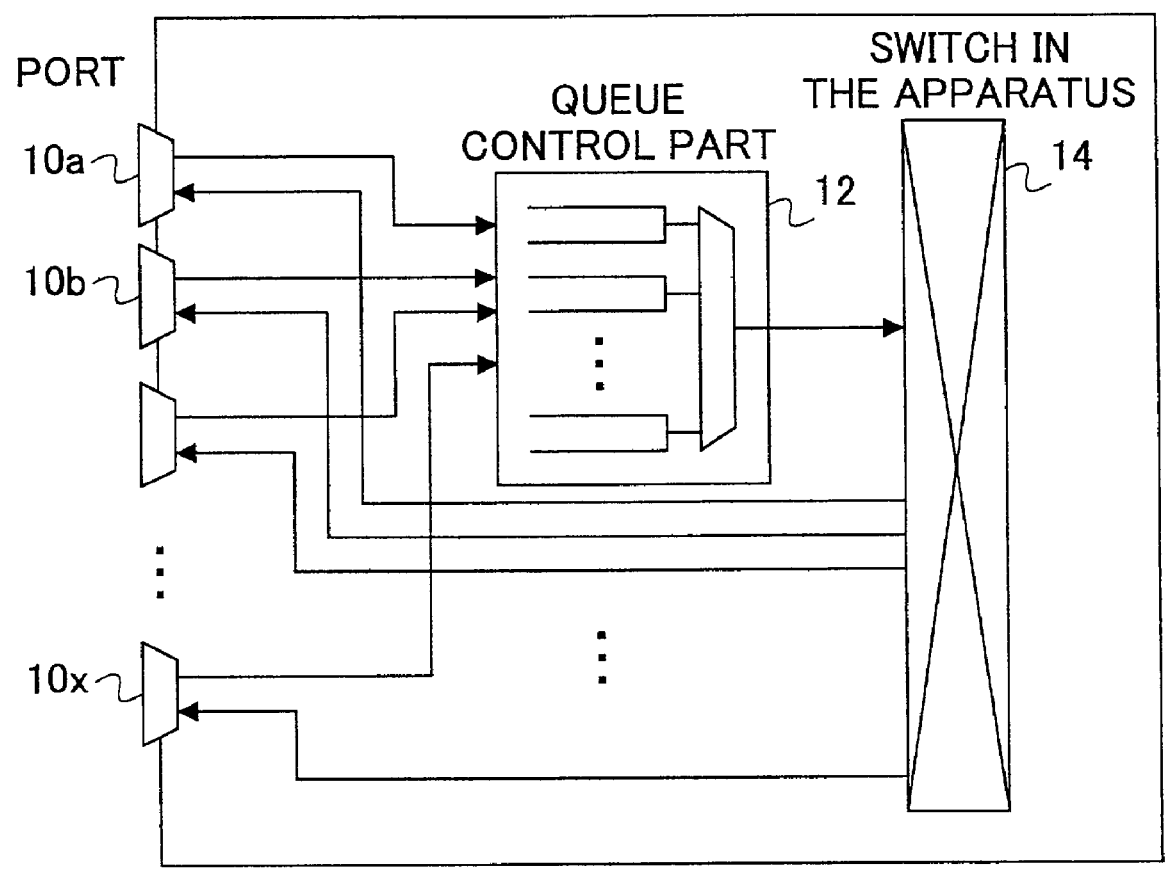
FIG. 1 shows a block diagram of an example of a conventional relay apparatus.
Figure 2:
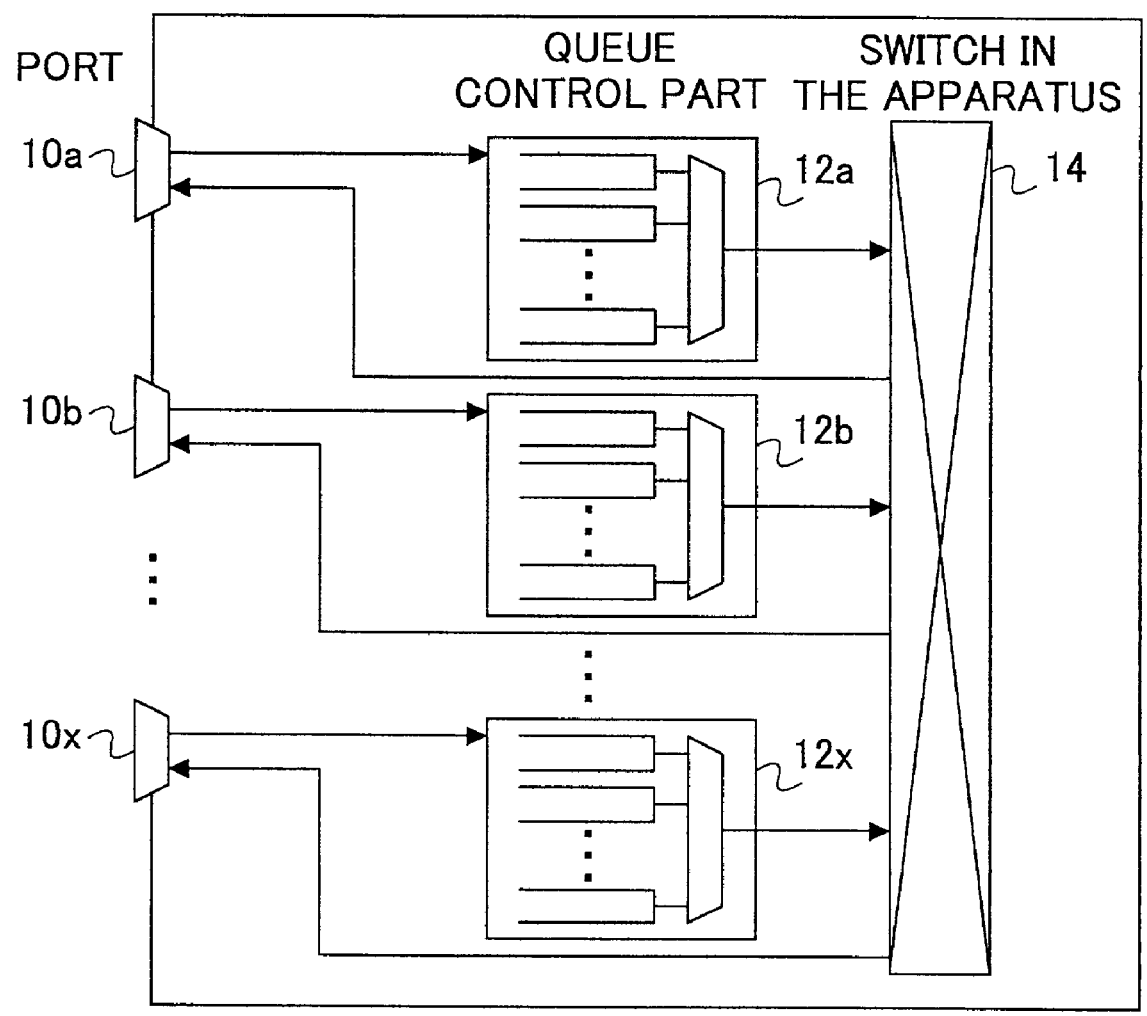
FIG. 2 shows a block diagram of another example of a conventional relay apparatus.
Figure 3:
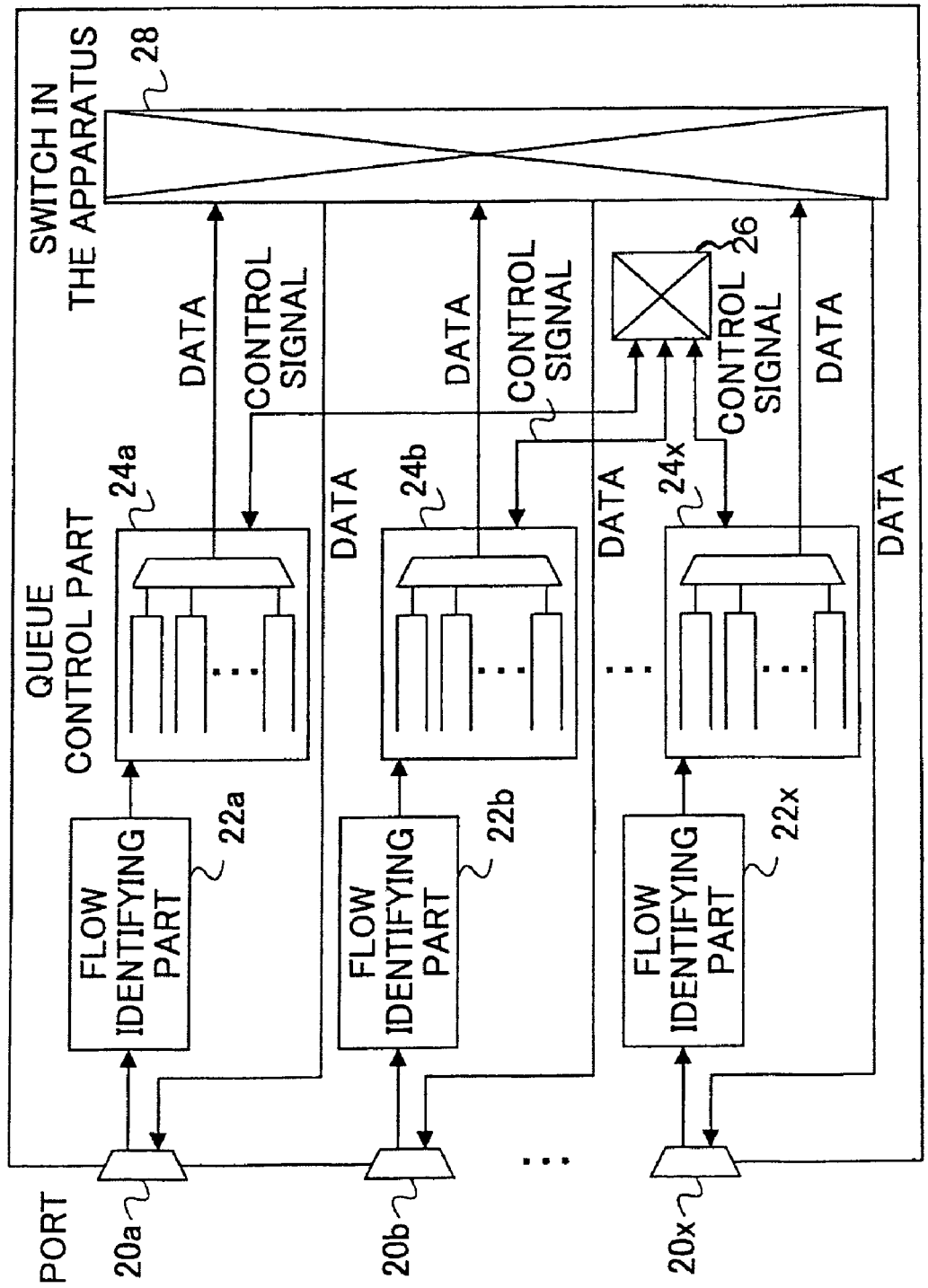
FIG. 3 shows a block diagram of an embodiment of the relay apparatus of the present invention.

FIG. 3 shows a block diagram of an embodiment of the relay apparatus of the present invention. In FIG. 3, each of a plurality of ports 20a–20x is connected to a physical circuit such as a LAN or a WAN. Flows received by the ports 20a–20x are provided to the flow identifying parts 22a–22x where priority of each flow is identified by using the header of each flow. Each identified information is added to a corresponding flow and the flows are provided to the queue control part 24a–24x. In this embodiment, although the queue control parts 24a–24x are provided corresponding to the ports 20a–20x respectively, the ports can be grouped into some groups each including some ports and one queue control part can be assigned to each group.

Each of the queue control part 24a–24x generates a control signal according to its own queue state, and the control signal is provided to other queue control parts via the control signal switch 26. Then, each of the queue control part 24a–24x performs its own queue control according to the control signals received from the other queue control parts. The flows dequeued from each of the queue control parts 24a–24x are switched by the switch 28 and provided to ports 20a–20x. Each flow is sent to a destination physical circuit from each port 20a–20x.

Accordingly, since the control signals are exchanged between a plurality of queue control parts 24a–24x, a unified priority control mechanism in a relay apparatus can be realized. For example, when data of high priority flow is becoming accumulated, dequeue of a low priority flow in another queue control part can be stopped.

In addition, when flows from a plurality of queue control parts 24a–24x are concentrated on a specific destination so that dequeue in a established bandwidth in a queue control part can not be performed, by decreasing dequeue bandwidths of low priority queues of other queue control parts temporarily, it becomes possible to perform bandwidth control for high priority flows. As a result, a unified priority control mechanism in a relay apparatus can be realized.

Figure 4:
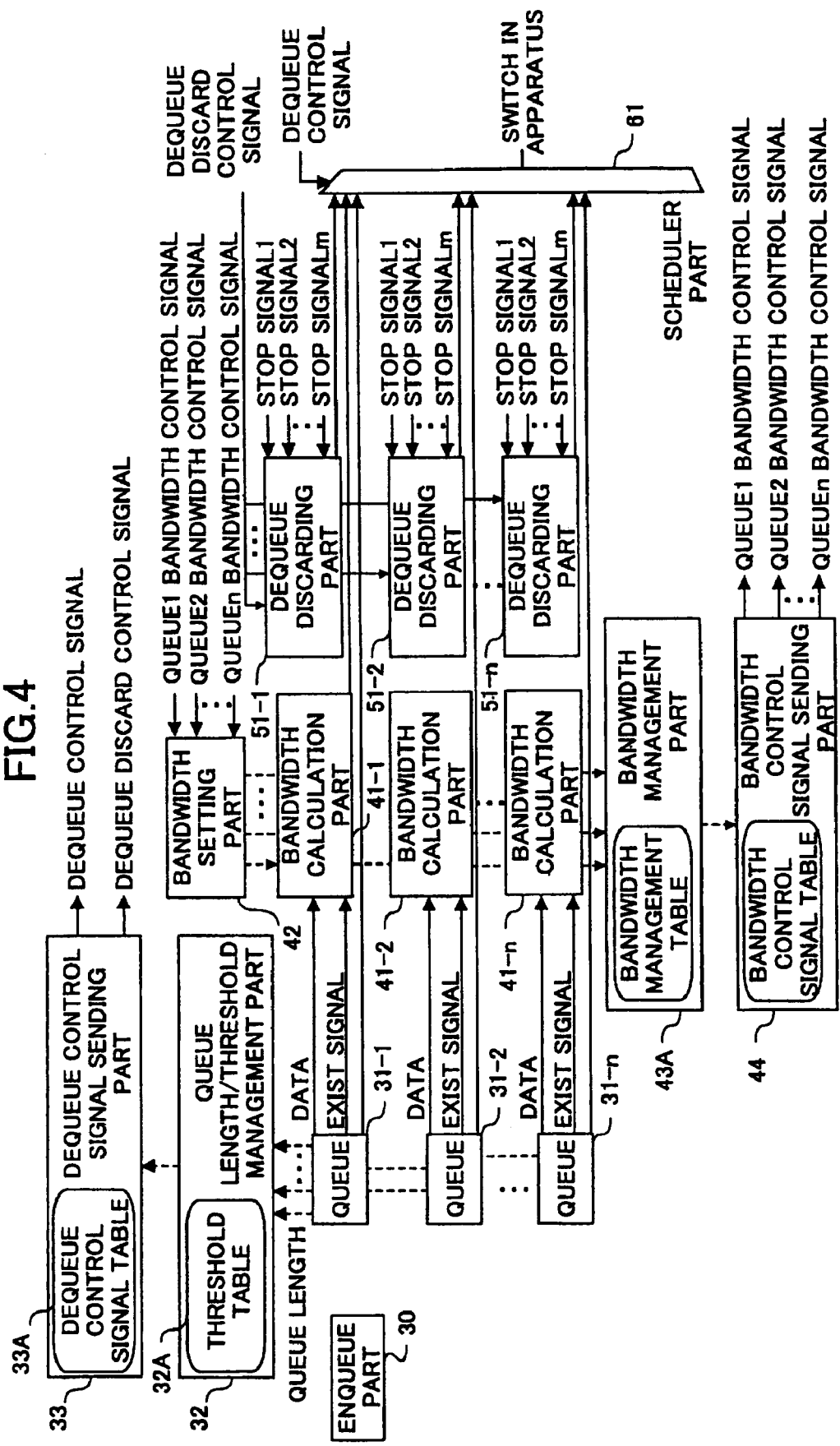
FIG. 4 shows a detailed block diagram of an embodiment of a queue control part.

FIG. 4 shows a detailed block diagram of an embodiment of the queue control part. In the figure, the enqueue part 30 enqueues a flow in a queue in the queues 31-1–31-n according to a flow priority on the basis of the corresponding identification information from the flow identifying part of the previous stage. Each of the queues 31-1–31-n has a function of a queue and informs a queue length/threshold management part 32 of a queue length which changes according to enqueue/dequeue one by one. In addition, when a dequeue request is received from a scheduler 61, the queue dequeues data and sends the dequeued flow data to a bandwidth calculation part (41-1–41-n). In this example, it is assumed that n queues are provided and there are m destination routes for the queue control part.

A queue length representing data amount accumulated in each queue is compared with a queue length threshold (which will be called simply a threshold hereinafter), then, a control signal is sent according to the result of the comparison. This function is realized by a queue length/threshold management part 32 and a dequeue control signal sending part 33.

The queue length/threshold management part 32 manages the queue lengths received from each of the queues 31-1–31-n one by one, and compares each queue length with a threshold in a threshold table 32A in which thresholds are registered for each queue. When it is detected that the queue length exceeds the threshold or the queue length falls short of the threshold, the information (threshold information) is sent to the dequeue control signal sending part 33.

FIG. 5 shows an example of the contents of the threshold table 32A. In the threshold table 32A, a plurality of thresholds ($\alpha$ queue length thresholds) are registered with threshold numbers for each queue. The queue length/threshold management part 32 compares the queue length of each queue with the corresponding registered thresholds, and sends a signal, to the dequeue control signal sending part 33, indicating that the queue length exceeds or falls short of what number of threshold.

Although FIG. 5 shows a case where $\alpha$ thresholds are set for each queue, the thresholds can be assigned to a part of queues, that is, a part of queues do not have thresholds. In addition, the numbers of thresholds for each queue may be different, and the numbers may be changed. In addition, the contents of the table can be set by a user or the contents may be fixed initially.

Figure 6:
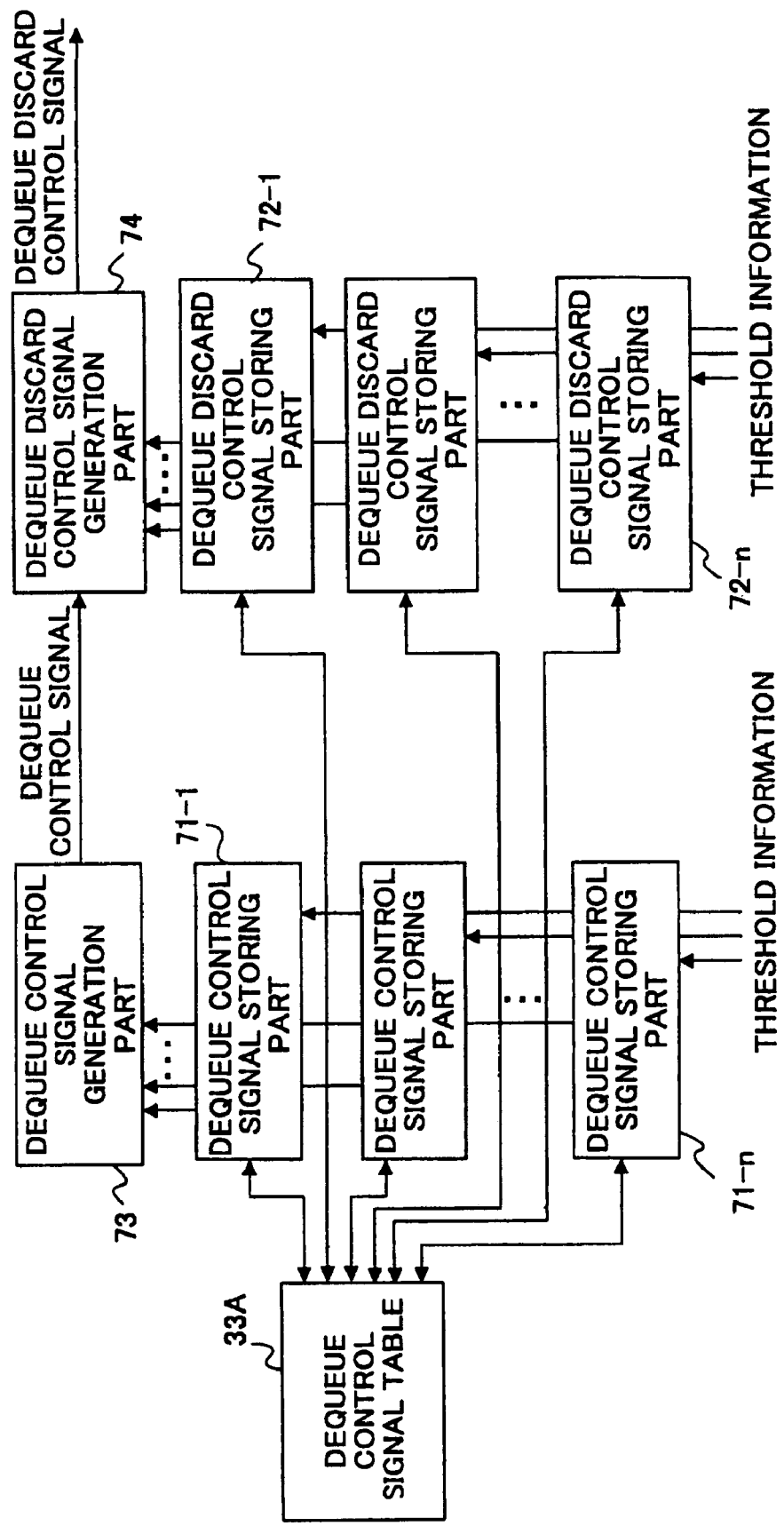
FIG. 6 shows a detailed block diagram of an embodiment of a dequeue control signal sending part 33.

The dequeue control signal sending part 33 generates a dequeue control signal and a dequeue discard control signal on the basis of threshold information received from the queue length/threshold management part 32. FIG. 6 shows a detailed block diagram of an embodiment of the dequeue control signal sending part 33. In the figure, each of dequeue control signal storing parts 71-1–71-n receives threshold information from each of the queues 31-1–31-n, and obtains a corresponding dequeue control signal (n bit) and a dequeue control signal timer value from a dequeue control signal table 33A and sends the dequeue control signal to the dequeue control signal generation part 73. In addition, a timer is embedded and the timer is started at the time when the dequeue control signal is extracted. When the value of the timer exceeds a dequeue control signal timer value, the received dequeue control signal is deleted (fill 0 to all bits), and this value is sent to the dequeue control signal generation part 73 as a new dequeue control signal.

In addition, each of the dequeue discard control signal storing parts 72-1–72-n receives the threshold information from each of the queues 31-1–31-n. Then, each of the dequeue discard control signal storing parts 72-1–72-n obtains a corresponding dequeue discard control signal (n bit) and a dequeue discard control signal timer value from the dequeue control signal table 33A and sends them to the dequeue discard control signal generation part 74. In addition, a timer is embedded and the timer is started at the time when the dequeue discard control signal is extracted. When the value of the timer exceeds a dequeue discard control signal timer value, the received dequeue discard control signal is deleted (fill 0 to all bits), and this value is sent to the dequeue discard control signal generation part 74 as a new dequeue discard control signal.

FIG. 7 shows an example of the contents of the dequeue control signal table 33A. In this example, $\alpha$ thresholds are set for each queue. The dequeue control signal DQp-q-r takes 0 or 1 (1 bit) and means that, if the dequeue control signal DQp-q-r is 1 when the queue length exceeds a threshold of a threshold number q in a queue p, dequeue from a queue r of other queue control parts is stopped (if the dequeue control signal DQp-q-r is 0, dequeue is not stopped).

The dequeue discard control signal DDp-q-r takes 0 or 1 (1 bit) and means that, if the dequeue discard control signal DDp-q-r is 1 when the queue length exceeds a threshold of a threshold number q in a queue p, dequeued data of a queue r of other queue control parts is discarded if the queue control parts receive a STOP signal from the switch (if 0, the data is not discarded). TQp-q and TDp-q indicate timer values for enabling the dequeue control signal and the dequeue discard control signal.

The dequeue control signal generation part 73 shown in FIG. 6 receives the dequeue control signals obtained according to the states of each queue from the dequeue control signal storing parts 71-1–71-n, and, extracts each bit of the n control signals, ORs bits of the same position, sends the finally obtained n bits as the dequeue control signal. By performing OR, all dequeue control information which is set according to the states of queues can be reflected.

The dequeue discard control signal generation part 74 shown in FIG. 7 receives the dequeue discard control signals obtained according to the states of each queue from the dequeue discard control signal storing parts 72-1–72-n, and, extracts each bit of the n control signals, ORs bits of the same position, sends the finally obtained n bits as the dequeue discard control signal. By performing OR, all dequeue control information which is set according to the states of queues can be reflected.

In this example, although two kinds of control signals are generated which are the dequeue control signal and the dequeue discard control signal by comparing the queue length and the threshold, contents of an after-mentioned bandwidth control signal may be added to the table such that the bandwidth control signal can be sent. In addition, a configuration can be adopted in which a part of the three kind of signals can be set.

In addition, although contents in the dequeue control signal and the dequeue discard signal of dequeue allowance or prohibition or discard or no-discard at the time of dequeue in the above-mentioned description are directly indicated in the table, a configuration can be also adopted in which the queue control part has a table including the contents of the dequeue control signal and the dequeue discard signal, and the sending side sends indirect information such as that indicating which item should be referred to in the table.

In FIG. 4, the mechanism of sending the control signal according to the state of send bandwidth error is realized by bandwidth calculation parts 41-1–41-n, a bandwidth management part 43 and a bandwidth control signal sending part 44.

Each of the bandwidth calculation parts 41-1-1-n has a set bandwidth sent from a bandwidth setting part 42. The bandwidth calculation part calculates bandwidth on the basis of a state in which data is dequeued from a queue when receiving an EXIST signal indicating that data is entered into the queue. Then, the bandwidth calculation part sends the EXIST signal to the scheduler 61 at a sending timing. In addition, the calculated bandwidth and the set bandwidth are compared one after another, and sends the error to the bandwidth management part 43.

The bandwidth management part 43 manages the received bandwidth errors for every queue 31-1–31-n, compares values in a bandwidth error table 43A and the received bandwidth errors. Then, the bandwidth management part 43 judges whether the bandwidth error is greater or smaller than which threshold in the bandwidth error table 43A. Then, the bandwidth management part 43 sends the bandwidth error information to the bandwidth control signal sending part 44.

FIG. 8 shows an example of the bandwidth error table 43A. A plurality of (b) bandwidth error thresholds are registered in the bandwidth error table 43A with bandwidth error number. The bandwidth management part 43 compares the bandwidth error of a queue with the bandwidth error threshold set for each queue, and informs the bandwidth control signal sending part 44 which threshold in the table is greater or smaller than the bandwidth error.

Although FIG. 8 indicates contents in a case where b bandwidth error thresholds are set for each queue, the bandwidth error thresholds may be set for a part of queues (that is, a part of queues do not have the bandwidth error thresholds). In addition, the number of the bandwidth error thresholds may be different for each queue or it may be changeable. Further, the contents of the bandwidth error table may be set by a user or may be fixed from the start.

The bandwidth control signal sending part 44 generates a bandwidth control signal on the basis of the bandwidth error information received from the bandwidth management part 43.

Figure 9:
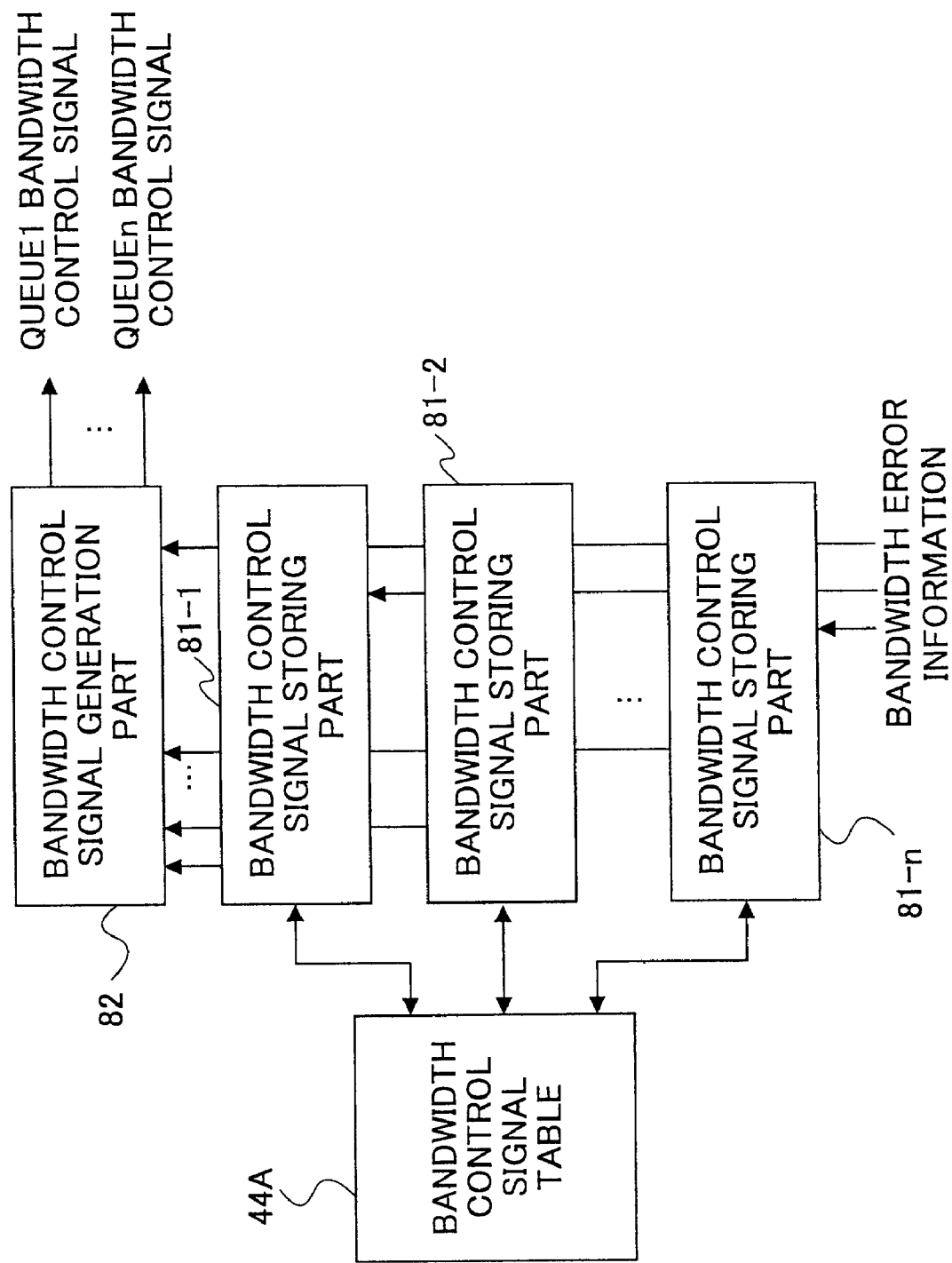
FIG. 9 shows a detailed block diagram of an embodiment of a bandwidth control signal sending part 44.

FIG. 9 shows a detailed block diagram of an embodiment of the bandwidth control signal sending part 44. In the figure, each of bandwidth control signal storing parts 81-1–81-n receives bandwidth error information from a corresponding queue, extracts a bandwidth control signal and a bandwidth control signal timer value corresponding to the queue from a bandwidth control signal table 44A, and sends the bandwidth control signal to the bandwidth control signal generation part 82. In addition, a timer is embedded, and the timer is started from the time of extracting the bandwidth control signal. When the timer value exceeds the bandwidth control signal timer value, the received bandwidth control signal is deleted (all bits are changed to 0), and this is sent to the bandwidth control signal generation part 82 as a new bandwidth control signal.

FIG. 10 shows an example of the bandwidth control signal table 44A. This corresponds to the above-mentioned description in which b bandwidth errors are set for each queue.

BCp-q-r indicates a bandwidth which are set in a queue r of other queue control parts when the error exceeds the bandwidth error number q in the queue p. In addition, TCp-q indicates a timer value in which extracted bandwidth control signal is effective.

Next, the bandwidth control signal generation part 82 shown in FIG. 9 receives the bandwidth control signal obtained according to the bandwidth error state of each queue from the bandwidth control signal storing parts. Then, the bandwidth control signal generation part 82 extracts kth ($1 \leq k \leq n$) control signals in the n kinds of control signals and sends a signal having the smallest value as a bandwidth control signal of other queue k. Since by adopting the smallest bandwidth, every bandwidth control information which is set according to each queue status can be reflected.

In this embodiment, although the bandwidth control signal is generated by comparing bandwidth error with the bandwidth error threshold which is a predetermined value, before-mentioned dequeue control signal and the dequeue discard control signal may be added to the table so that these control signals are sent. In addition, the apparatus may be configured such that a part of the three kinds of signals is set.

In the above description, although bandwidth for each queue set by the bandwidth control signal is directly specified in the table, the queue control part which receives the bandwidth control signal may include a table having a pair of bandwidth error and bandwidth so that a sending part may send indirect information such as one indicating which item should be referred to in the table.

In FIG. 4, the bandwidth setting part 42, the dequeue discarding part 51 and the scheduler part 61 receive the sent control signals (the dequeue control signal, the dequeue discard control signal, and the bandwidth control signal), and realizes change of the priority control and bandwidth control on the basis of the control signals.

The bandwidth control part 42 receives the bandwidth control signals (n kinds of signals for queue 31-1–queue 31-n), and sends them to corresponding bandwidth calculation parts 41-1–41n. When the bandwidth control part 42 does not receive any bandwidth control signal, the bandwidth control part 42 sends bandwidth which has been initially set. Accordingly, bandwidth control can be changed on the basis of the received bandwidth control signals. The initially set bandwidth may be set from a user or may be assigned beforehand.

Each of the dequeue discarding parts 51-1-51-n receives kth bit ($1 \leq k \leq n$) of dequeue discarding signal, and checks a destination of data which was dequeued. Then, when a STOP signal (STOP signal is a signal come from the switch in the apparatus) from the destination is received and the kth bit of the dequeue discarding signal is 1, the dequeue discarding part discards the data and informs the scheduler part 61 of it. When the kth bit of the dequeue discard signal is 0, the dequeue discarding part waits until the STOP signal is released. After the STOP signal is released, the dequeue discarding part sends the data to the scheduler part 61. When the STOP signal from the destination of the data is not received, the data is sent to the scheduler part 61 irrespective of contents of the dequeue discard signal. Accordingly, it becomes possible to change control whether data is discarded or not when performing dequeue on the basis of the received dequeue discarding control signal.

The scheduler part 61 requests dequeue for queues to be dequeued according to a scheduling algorithm stored in its own queue control part, receives data and sends it to the switch in the apparatus. At this time, when kth ($1 \leq k \leq n$) bit of the received dequeue control signal is 1, scheduling process is not performed for the queue 31-k (removing the queue 31-k from subjects of scheduling). Accordingly, it becomes possible to change control in which dequeue is performed or not for each queue.

Next, as for the configuration of the switch 26 for control signals, logical sum is calculated for each bit for the dequeue control signal and dequeue discarding control signal (each m kinds) and they are sent to all queue control parts 24a~24x. Accordingly, all of a plurality of items of control information set between a plurality of queue control parts can be reflected.

In addition, in each of the bandwidth control signals (m kinds) in the queue 31-k ($1 \leq k \leq n$), the values are compared, and the smallest bandwidth is sent to every queue control part 24a~24x as a bandwidth control signal of the queue control part 31-k. Accordingly, all of a plurality of items of control information set between a plurality of queue control parts can be reflected.

In the above description, although the control signal is always received and the information is reflected to the other queue control part, a configuration can be adopted in which new control signal information is sent as a data unit like a packet only when control information is changed in the queue control part and the data is switched to other queue control part. In addition, the queue control parts can be connected directly instead of adopting the switch 26 for control signal.

Figure 11:
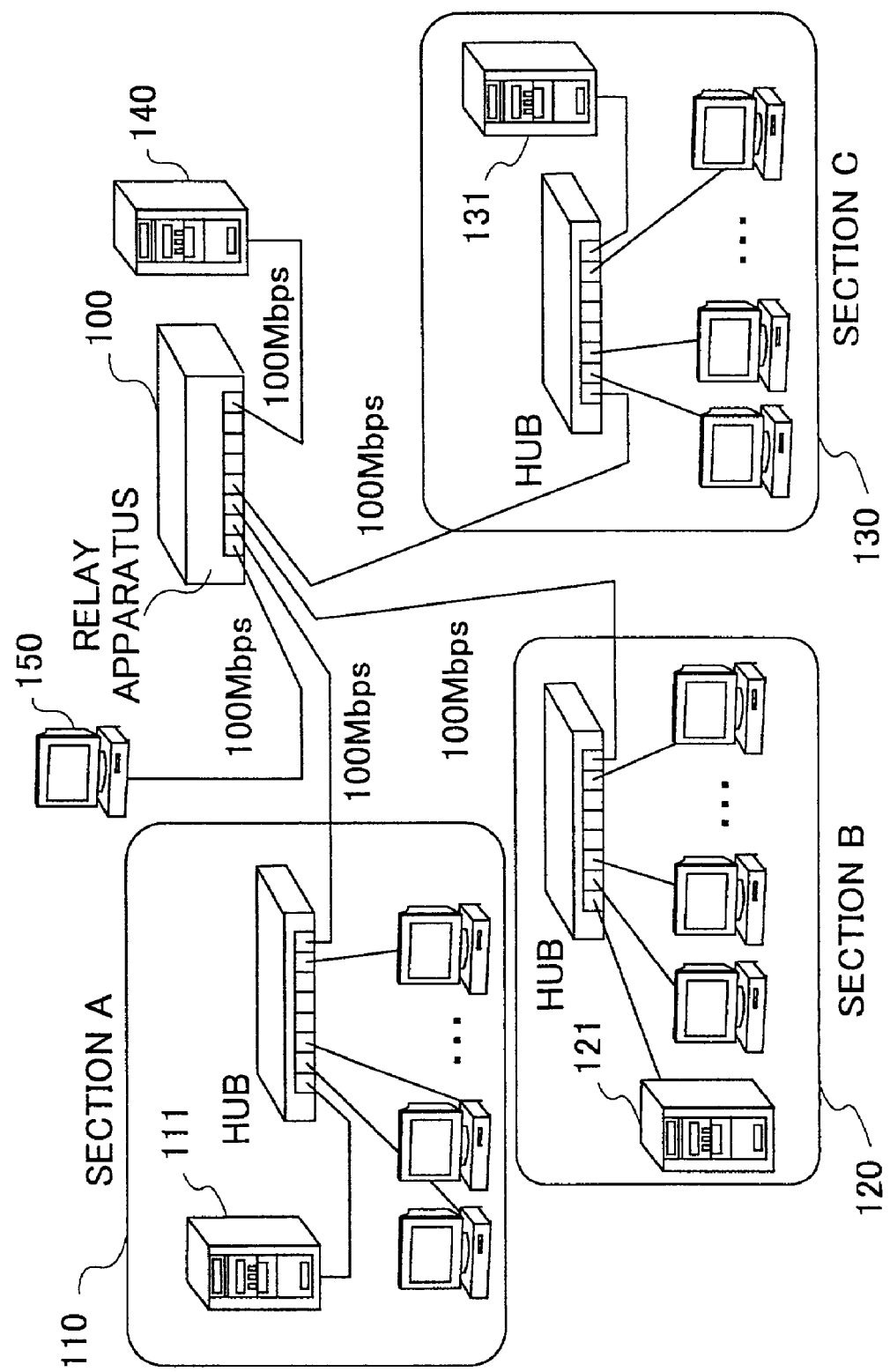
FIG. 11 is a block diagram of a network system of an embodiment to which the relay apparatus of the present invention is applied.

FIG. 11 is a block diagram of a network system of an embodiment to which the relay apparatus of the present invention is applied. In FIG. 11, networks 110, 120 and 130 of three sections A, B and C, an ftp server and a terminal 150 which manages the ftp server remotely are connected to the relay apparatus 100. In addition, each section has an http server 111, 121 and 131.

The relay apparatus 100 includes a queue control part for each one port, and following settings are made for the queue control parts.

(Assignment of Float Queue)
1. Every flow from the terminal 150 for ftp server management is assigned to a queue of high priority.
2. Flow of ftp is assigned to a queue of mid-priority.
3. Other flows such as http are assigned to a queue of low priority.

(Bandwidth Setting of Each Queue)
1. Bandwidth of the queue of the mid-priority is 50 Mbps.
2. Bandwidth of the queue of the low priority is 100 Mbps.
3. Bandwidth of the queue of the high priority is not determined.

(Setting of Threshold)
1. Two thresholds 1 and 2 of two queue lengths are set for the queue of the high priority. When queue length exceeds the threshold 1, dequeue from queues of the mid-priority and the low priority is stopped for a short time (when the queue length decreases below the threshold, dequeue is restarted). When the queue length exceeds the threshold 2, dequeue of flow of the mid-priority or the low priority is stopped.
2. Two thresholds of bandwidth error are set for the queue of the mid-priority, when the bandwidth exceeds a threshold 1, bandwidth of the mid-priority is set to 40 Mbps, and bandwidth of the low priority is set to be 50 Mbps. When the bandwidth error exceeds threshold 2, bandwidth of mid-priority is set to be 30 Mbps and bandwidth of the low priority is set to be 10 Mbps. When the bandwidth error falls below the threshold 2, the settings becomes the setting for exceeding the threshold 1, and when the bandwidth error falls below the threshold 1, the setting becomes initial setting.
3. One threshold of queue length is set for the queue of low priority. When the queue length exceeds the threshold, dequeue discard is set from the low priority. When the queue length falls below the threshold, the dequeue discard is released.

When above settings are made, even when access amount from the sections A, B and C to the ftp server is large so that communication from the terminal 150 managing the ftp server 140 is congested, that is, even when data is accumulated in the high priority queue, the relay apparatus 100 can perform management of the ftp server remotely by stopping flow of the mid-priority or the low priority of the other queue control part.

In addition, since the data amount transmitted for server management is not so large, the status in which data is accumulated in the queue occurs temporarily. Thus, by stopping dequeue from the queue of the mid-priority or the low priority for a short time, dequeue can be restarted from the mid priority or low priority earlier than that data falls below the threshold of the high priority queue. The reason is that, since the flow accumulating in the high priority queue occurs temporarily, flow does not accumulate in the high priority queue even when dequeue is restarted from the queue of the mid-priority or the low priority. Therefore, communication stop state occurred by stopping dequeue can be suppressed to minimum.

By setting two stages of the queue length thresholds, even in a case where increase of queue length can not be suppressed by stopping dequeue from the queue of the mid-priority/low priority temporality when the queue length exceeds the threshold 1, the flow of the mid-priority or the low priority can be stopped for a long time when the queue length exceeds the threshold 2. As a result, it can be avoided that the flow for server management is discarded due to queue overflow.

Next, a case where ftp communication from the sections A, B and C to the ftp server 140 is concentrated will be considered. At this time, since the speed of ftp communication is set as 50 Mbps, sum of load to the ftp server becomes 150 Mbps at the maximum. However, since the circuit speed to the ftp server 140 is 100 Mbps as shown in FIG. 11, bandwidth of 50 Mbps from the queue of the mid-priority can not be kept when the load is large. In addition, the bandwidth for the ftp communication is affected also by flows (http or other communication) of low priority from other queue control parts. Therefore, when the bandwidth error becomes large, the sum of load to the ftp server 140 is decreased by decreasing the bandwidth in stages (in two stages in this embodiment).

By decreasing the bandwidth in a plurality of stages, communication by using a bandwidth near to optimum bandwidth according to load status becomes possible so that the circuit can be used efficiently. In addition, in this process, only bandwidth for sending is changed, and the bandwidth can be changed independently from a process of stopping dequeue of a specific queue. Thus, inconvenience that dequeue of a specific flow is stopped as the bandwidth is changed does not occur.

In the state where the ftp communication to the ftp server 140 from the sections A, B and C is concentrated, the bandwidth control signal (change of setting bandwidth) is output from each of queue control parts connected to the sections A, B and C in the relay apparatus 100. In a case where contents in the bandwidth control signals output most recently are set in all queue control parts, following inconvenience occurs. When only ftp communication from the section A decreases temporarily and a bandwidth control signal for returning the bandwidth is sent, an inconvenience occurs in which the bandwidth is returned even in a state that the queue is congested since ftp communication from the sections B and C is large. However, since the configuration of the present invention adopts a method of following a control signal in which smallest bandwidth is set by collecting a plurality of control signals, such an inconvenience does not occur.

Next, when whole bandwidth of 100 Mbps from the section A is for accessing the http server in the section C, http access from the section B to the section C is 90 Mbps, and http access to the section A is 10 Mbps, 190 Mbps access concentrates on the http server 131 in the section C. Thus, communication to the section C is congested. Since the queue control part connected to the network of the section B in the relay apparatus 100 includes two kinds of flows in the same queue, when dequeue of this queue is stopped or the bandwidth is decreased, communication to the section A is discarded due to queue overflow. Therefore, if dequeue discarding is set such that it is performed when the queue exceeds the threshold which is set in the queue of low priority, dequeue overflow can be avoided since the dequeue from the queue of low priority can be performed in full performance. That is, the communication to the section A is not discarded due to queue overflow. In addition, since the STOP signal is applied for communication to the section C in the relay apparatus, the communication may be discarded by dequeue discarding setting. However, the communication to the section A is not discarded since the circuit has an allowance.

As mentioned above, according to the present invention, even for a large relay apparatus in which queue control can not be performed unless a plurality of queue control parts are provided, the large relay apparatus can perform priority control same as that of an apparatus having one queue control part. In addition, by including information on bandwidth setting in the control signals between the queue control parts, dynamic bandwidth control between the queue control parts can be performed.

For performing the same control by using the other method, it is necessary to configure the relay apparatus such that it includes one queue control part. Therefore, when the capacity of the relay apparatus is large, relay performance of the apparatus can not be increased. Thus, a plurality of apparatuses are necessary for covering the large capacity.

In such a case, in order to perform communication over the apparatuses, it is necessary to introduce larger relay apparatuses. By the conventional technology, priority control such as that shown in the present invention can not be performed for flows passing through the larger relay apparatuses. Therefore, considering cost and performance, the present invention is very effective since the priority control of the present invention can not be performed by the conventional apparatuses.

As mentioned above, according to the present invention, a relay apparatus which includes a plurality of ports connected to a network for sending and receiving data and performs relay of flows between networks can be provided in which the relay apparatus includes: a plurality of queue control parts, which are connected to one or more ports, for performing queue control of enqueuing flows from the one or more ports to a plurality of queues each having different priority, and dequeuing the flows; a switch for switching flows dequeued from the queue control parts and sending the flows dequeued from the queue control parts from the ports; and wherein control signals are sent and received between the queue control parts such that queue control for arbitrary queue in the queue control parts is performed.

Therefore, adjustment between a plurality of queue control parts can be performed, and priority control and bandwidth control can be performed in the apparatus as a whole.

In the relay apparatus, the control signal sent from a queue control part to another queue control part may include information used for changing queue priority control for a part or the whole of queues in the another queue control part. Thus, priority control can be performed in the apparatus as a whole.

In addition, the control signal sent from a queue control part to another queue control part may include information used for changing setting of bandwidth for dequeuing data for a part or the whole of queues in the another queue control part. Thus, priority control can be performed in the apparatus as a whole.

In the relay apparatus, the queue control part may send the control signal when a queue length of each queue exceeds or falls below a predetermined queue length threshold for a part of the whole of queues in the queue control part, and a plurality of queue length thresholds may be set for each queue. Accordingly, delicate priority control can be performed.

The queue control part may includes a bandwidth calculation part for calculating bandwidth for a part or the whole of queues in the queue control part; and the queue control part sends the control signal when a bandwidth error when dequeue can not be performed by using a predetermined bandwidth exceeds or falls below a predetermined bandwidth error threshold, and a plurality of bandwidth error thresholds are set for each queue. Accordingly, delicate bandwidth control can be performed.

In addition, in the relay apparatus, the information used for changing queue priority control may be released after a predetermined time. Accordingly, change of queue priority control can be performed temporarily and it becomes possible to return to normal queue priority control after that.

In addition, information used for changing setting of bandwidth may be released after a predetermined time. Accordingly, change of bandwidth setting in bandwidth control can be performed temporarily and it becomes possible to return to normal bandwidth setting after that.

The present invention is not limited to the specifically disclosed embodiments, and variations and modifications may be made without departing from the scope of the invention.

What is claimed is:

1. A queue control method used in a relay apparatus which includes a plurality of ports for sending and receiving and performs relay of flows between networks, said queue control method comprising the steps of:
    performing queue control in which queue control parts which are connected to one or more ports enqueue flows from said one or more ports to a plurality of queues each having different priority, and dequeue said flows;
    sending and receiving control signals between said queue control parts such that queue control for arbitrary queue is performed in each queue control part; and
    switching flows dequeued from said queue control parts and sending said flows dequeued from said queue control parts to said ports.

2. A relay apparatus which includes a plurality of ports connected to a network for sending and receiving data and performs relay of flows between networks, said relay apparatus comprising:
    a plurality of queue control parts, which are connected to one or more ports, for performing queue control of enqueuing flows from said one or more ports to a plurality of queues each having different priority, and dequeuing said flows;
    a control signal exchanging part for providing a control signal from each queue control part to other queue control parts so that each queue control part performs its own queue control;
    a switch for switching flows dequeued from said queue control parts and sending said flows dequeued from said queue control parts from said ports; and
    wherein control signals are sent and received between said queue control parts such that queue control for arbitrary queue in said queue control parts is performed.

3. The relay apparatus as claimed in claim 2, wherein said control signal sent from a queue control part to another queue control part includes information used for changing queue priority control for a part or the whole of queues in said another queue control part.

4. The relay apparatus as claimed in claim 3, wherein said queue control part sends said control signal when a queue length of each queue exceeds or falls below a predetermined queue length threshold for a part of the whole of queues in said queue control part.

5. The relay apparatus as claimed in claim 4, wherein a plurality of queue length thresholds may be set for each queue.

6. The relay apparatus as claimed in claim 3, wherein said information used for changing queue priority control is released after a predetermined time.

7. The relay apparatus as claimed in claim 3, wherein said queue control part changes said queue priority control according to a result of logical operation of control signals received from other queue control parts.

8. The relay apparatus as claimed in claim 3, wherein said information used for changing said queue priority control is an instruction to stop or not to stop dequeue from each queue in said queue control part.

9. The relay apparatus as claimed in claim 3, wherein said information used for changing said queue priority control is an instruction to discard or not to discard dequeue from each queue in said queue control part.

10. The relay apparatus as claimed in claim 2, wherein said control signal sent from a queue control part to another queue control part includes information used for changing setting of bandwidth for dequeuing data for a part or the whole of queues in said another queue control part.

11. The relay apparatus as claimed in claim 10, said queue control part comprising:
    a bandwidth calculation part for calculating bandwidth for a part or the whole of queues in said queue control part;
    wherein said queue control part sends said control signal when a bandwidth error of each queue exceeds or falls below a predetermined bandwidth error threshold, and
    wherein said bandwidth error is an error between a calculated bandwidth and a set bandwidth.

12. The relay apparatus as claimed in claim 11, wherein a plurality of bandwidth error thresholds are set for each queue.

13. The relay apparatus as claimed in claim 10, wherein information used for changing setting of bandwidth is released after a predetermined time.

14. The relay apparatus as claimed in claim 10, wherein said queue control part changes said setting of bandwidth for dequeuing according to a result of logical operation of control signals received from other queue control parts.

* * * * *